United States Patent
Stauss

(10) Patent No.: US 7,549,819 B2
(45) Date of Patent: Jun. 23, 2009

(54) DEVICE COMPRISING TWO HOLLOW PROFILES THAT ARE HELD TOGETHER BY MEANS OF A CONNECTING SCREW, AND CORRESPONDING TOOL

(76) Inventor: Ulrich Stauss, Oberndorfer Str. 13, 78628 Rottweil (DE)

( * ) Notice: Subject to any disclaimer, the term of this patent is extended or adjusted under 35 U.S.C. 154(b) by 0 days.

(21) Appl. No.: 10/566,885

(22) PCT Filed: Jul. 29, 2004

(86) PCT No.: PCT/EP2004/008482

§ 371 (c)(1),
(2), (4) Date: Feb. 1, 2006

(87) PCT Pub. No.: WO2005/017372

PCT Pub. Date: Feb. 24, 2005

(65) Prior Publication Data

US 2006/0210355 A1    Sep. 21, 2006

(30) Foreign Application Priority Data

Aug. 5, 2003    (DE) .................... 203 12 075 U

(51) Int. Cl.
    F16B 7/00      (2006.01)
    F16B 7/18      (2006.01)
    F16B 35/06     (2006.01)
(52) U.S. Cl. .................. 403/387; 403/20; 403/296; 403/403; 81/57.28; 81/488
(58) Field of Classification Search .............. 403/19, 403/20, 296, 297, 387, 388, 403, 363; 81/57.28, 81/436, 488; 411/402
See application file for complete search history.

(56) References Cited

U.S. PATENT DOCUMENTS

| 1,309,727 | A | * | 7/1919 | Greig .................. 81/57.28 |
| 3,437,362 | A | * | 4/1969 | Offenbroich |
| 4,685,848 | A | * | 8/1987 | Langer .................. 411/402 |
| 5,295,756 | A | * | 3/1994 | Ohta .................... 403/19 |
| 5,310,273 | A | * | 5/1994 | Hara |
| 5,371,988 | A | * | 12/1994 | Hannes |
| 5,743,670 | A | * | 4/1998 | Ader .................... 403/296 |

FOREIGN PATENT DOCUMENTS

| DE | 2 254 582 | | 5/1974 |
| DE | 3146805 A1 | * | 6/1983 |

(Continued)

*Primary Examiner*—Daniel P Stodola
*Assistant Examiner*—Ernesto Garcia
(74) *Attorney, Agent, or Firm*—Bachman & LaPointe, P.C.

(57) ABSTRACT

A device comprising two hollow profiles which are arranged approximately at a right angle from each other and each of which is provided with a profiling channel that extends parallel to the longitudinal axis (A) of the profile and an undercut longitudinal groove in at least one lateral face of the profile, the longitudinal groove extending parallel to the profiling channel. The two hollow profiles are held together by a connecting screw whose shaft engages into the profiling channel of one hollow profile and whose screw head is mounted within an undercut longitudinal groove of the other hollow profile. The periphery of the screw head is provided with grooves or notches that run on planes extending from the longitudinal axis (M) of the shaft while forming ribs therebetween.

11 Claims, 4 Drawing Sheets

FOREIGN PATENT DOCUMENTS

| | | |
|---|---|---|
| DE | 19823229 A1 * | 12/1999 |
| DE | 201 06 561 | 8/2001 |
| DE | 10156222 C1 * | 6/2003 |
| DE | 10200964 A1 * | 7/2003 |
| FR | 1356877 * | 3/1964 |
| JP | 2002339924 A * | 11/2002 |
| WO | WO 93/03283 | 2/1993 |

\* cited by examiner

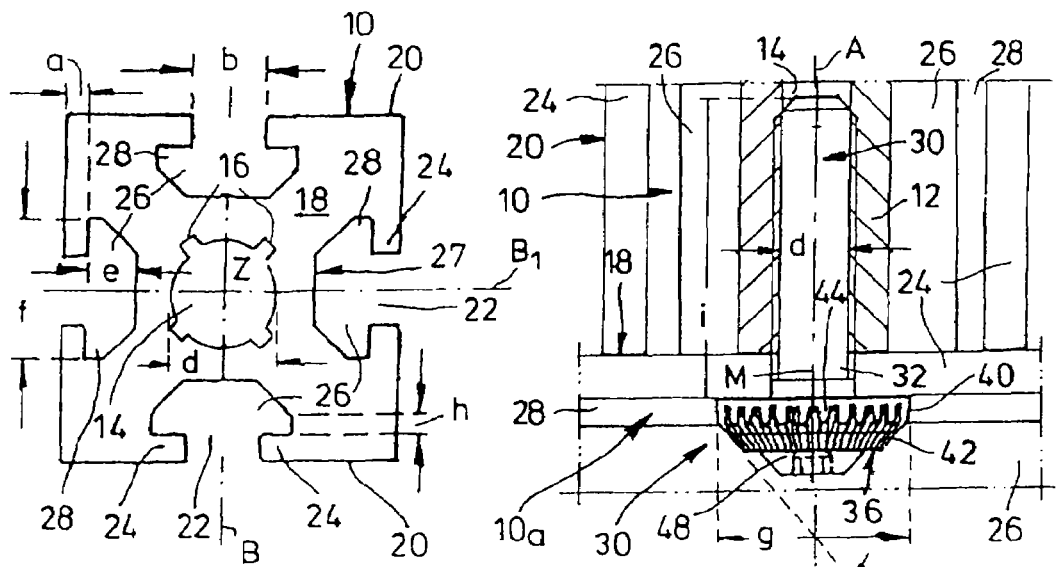
Fig.1
Fig.3
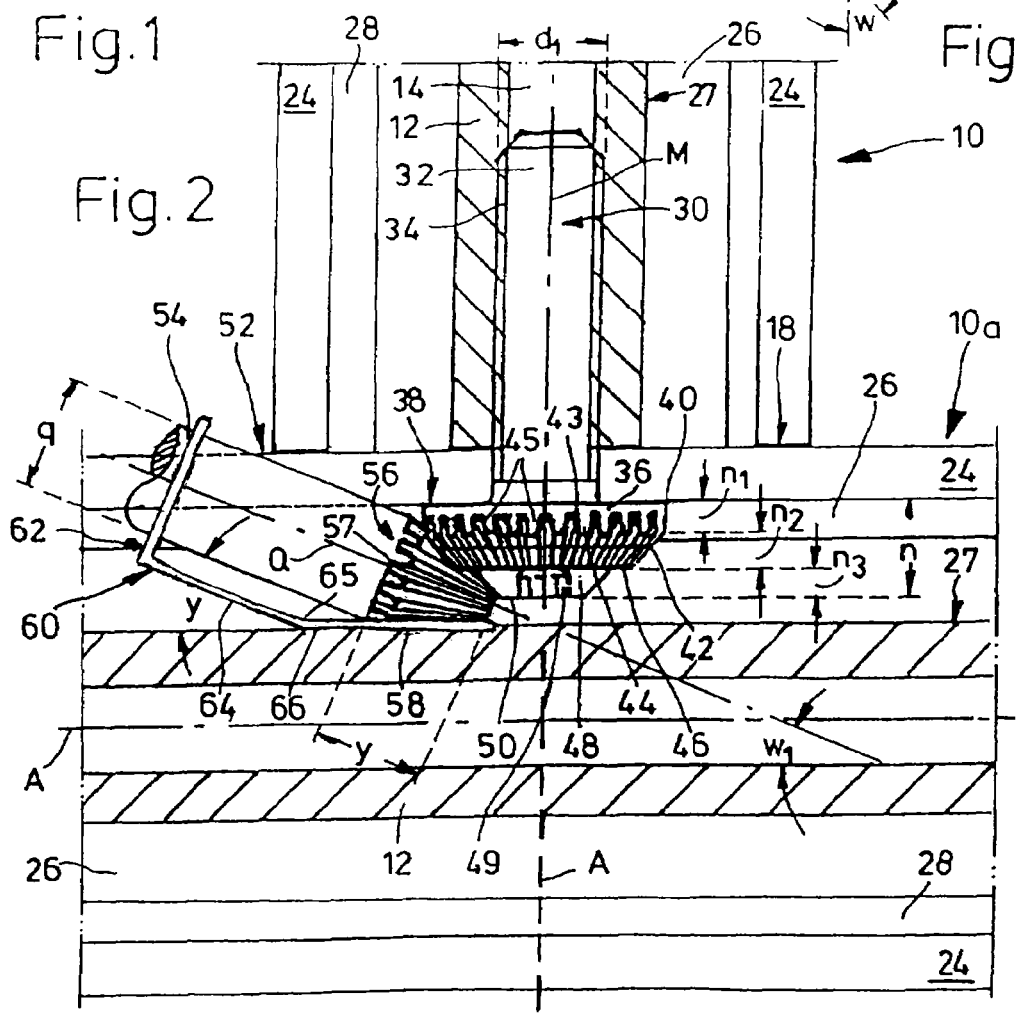
Fig.2

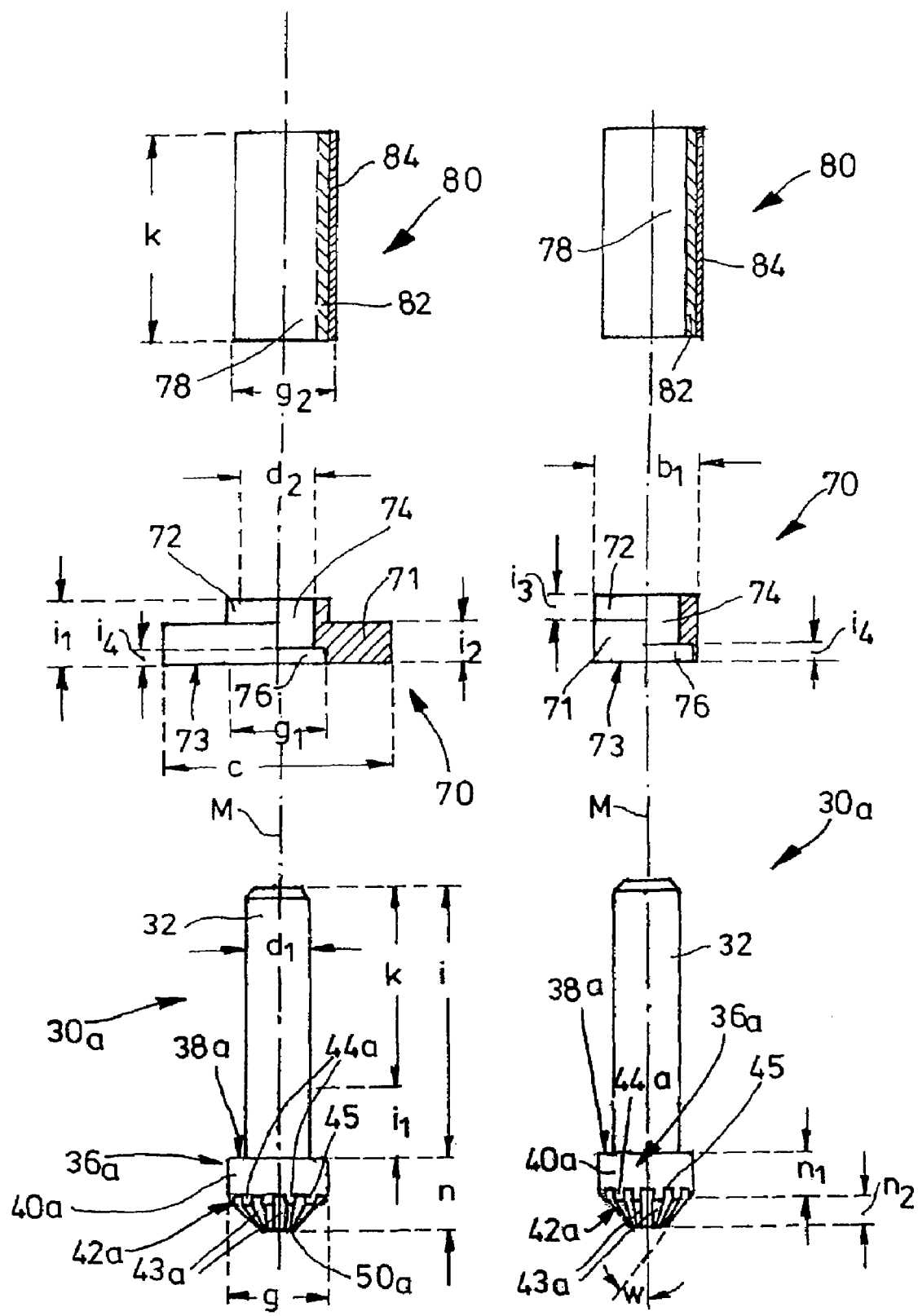

DEVICE COMPRISING TWO HOLLOW PROFILES THAT ARE HELD TOGETHER BY MEANS OF A CONNECTING SCREW, AND CORRESPONDING TOOL

BACKGROUND OF THE INVENTION

The invention relates to a device comprising two hollow profiles arranged in a butt-jointed manner approximately at right angles to one another, each of which has a profile channel parallel to its profile longitudinal axis and also, in at least one profile side surface, an undercut longitudinal groove parallel to the profile channel. The invention furthermore relates to a tool for operating the connecting bolt.

Document DE 201 06 561 discloses a device for connecting a first profile bar to a second profile bar which bears with a front face against a longitudinal side of the first profile bar. These profile bars are provided with undercut longitudinal grooves along their longitudinal sides and contain a clamping screw with a screw head and a threaded shaft which can be fixed in the region of the screw head in the undercut longitudinal groove of the first profile bar and can be screwed with its threaded shaft into a longitudinal bore formed in the second profile bar. Said screw head has, on a disc-shaped collar, a toothing which can be brought into active connection with a turning tool. The turning tool is a bar with a toothing integrally formed in an axis-parallel manner at one of its ends, which toothing can be brought into contact with the toothing on the collar.

Another device is described in EP 0 136 431 A2. Two hollow profiles of square cross section with a central profile channel and a longitudinal groove running centrally in each profile side surface are connected by means of a commercially available screw. The latter passes through an elongate insertion plate which is arranged in the undercut groove space of the longitudinal groove, said plate having legs which protrude in a U-shaped manner and which pass through the longitudinal groove for holding purposes and to prevent twisting. In order to be able to operate the screw, there must be in the bottom of the groove a number of openings which penetrate the hollow profile; the screwdriver which is to be inserted into a slot in the screw head is introduced through one of these openings.

The hollow profiles, which are usually extruded from an aluminium alloy, must therefore be reworked in a special way after they have been manufactured; the making of the radial openings is very complicated and considerably reduces the stability of the profile.

Knowing this prior art, the inventor set himself the aim of improving the system outlined above and avoiding additional processing of the holding profiles that are used. The longitudinal grooves are to remain open so that it is possible where necessary to introduce flat elements.

SUMMARY OF THE INVENTION

This aim is achieved by a device comprising two hollow profiles arranged approximately at right angles to one another, each of which has a profile channel parallel to its profile longitudinal axis (A) and also, in at least one profile side surface, an undercut longitudinal groove parallel to the profile channel, wherein the two hollow profiles are held together by a connecting screw, the shaft of which engages in the profile channel of one hollow profile and the screw head of which is mounted in an undercut longitudinal groove of the other hollow profile, wherein the screw head is provided on its periphery with grooves or notches which run in planes extending from the shaft longitudinal axis (M) and form ribs between them.

According to the invention, the screw head of the connecting screw tapers provided on its periphery—which is circular in cross section—with grooves or notches which run in planes extending from the shaft longitudinal axis—and defined by the latter in terms of their course—and form ribs between them. It has proven to be advantageous that the screw head tapers conically towards a head surface remote from the shaft, and this wall surface which is inclined at an angle with respect to the shaft longitudinal axis contains said grooves or notches. This angle should preferably be approximately 45°.

According to a further feature of the invention, the screw head should have, between a shaft-facing connection surface and the inclined wall surface, an annular section of constant diameter in which the shaft-facing ends of the grooves or notches form a crenellated edge pattern. The inclined wall surface should end at the head surface of the screw head or—in another embodiment—at a radial step surface, which latter surrounds in an annular manner an integrally formed top body. This tooth-free or notch-free end section is supported on the groove bottom when screwed on, and ensures a mating hold.

The shaft of the connecting screw (also referred to as a connecting bolt) which adjoins this screw head is advantageously provided with a cutting thread which cuts a counter-thread in the inner surface of the profile channel during assembly.

According to the invention, assigned to the shaft of the connecting screw is a slip-on collar which is provided with a central opening and can be placed against the connection surface of the screw head, the width of said slip-on collar being shorter than the width of the longitudinal groove of the hollow profile; the slip-on collar can thus be lowered into the latter. Preferably, a collar piece should be integrally formed on a base strip of the slip-on collar, wherein the length of said base strip is greater than the width of the longitudinal groove of the hollow profile; as a result, when the slip-on collar is rotated, the latter strikes the inside of the longitudinal groove on both sides in a retaining manner.

This embodiment is supplemented in that a threaded sleeve with outer thread is axially assigned to the collar piece of the slip-on collar, said threaded sleeve receiving the free end of the shaft. In this case, the length of the shaft should correspond approximately to the height of the slip-on collar plus the length of the threaded sleeve. However, an axially oriented widening of the opening should be integrally formed in the lower surface of the base strip in order to temporarily—and securely—receive a region of the annular section of the screw head. Said threaded sleeve is advantageously designed such that its outer diameter corresponds approximately to the width of the slip-on collar, so that the threaded sleeve can thus be inserted in the longitudinal groove.

The scope of the invention also includes a tool for operating the connecting screw in a screw head arranged in a groove space of a hollow profile. This tool comprises a round profile with an insertion head provided at one end, said insertion head having longitudinal notches which are made in its (preferably conically tapering) peripheral surface and receive the radially protruding ribs of the screw head so as to operate or rotate the connecting bolt; the pattern of the longitudinal notches on the tool thus corresponds to the arrangement of the ribs on the screw head.

It has proven advantageous to make the diameter of the round profile shorter than the depth of the groove space of the hollow profile, in order to make it possible to insert the tool into the groove space.

Moreover, the angle between the axis of the round profile and the peripheral or outer surface of the insertion head should be approximately 20° to 40°, in particular approximately 25°. This likewise facilitates insertion of the tool, the grooves of which are to receive the ribs of the screw head on the connecting screw.

In order to prevent damage to the hollow profile, according to the invention a protective section of a protective surface bears against the described peripheral or outer surface of the insertion head, said protective surface being releasably fixed to the round profile, namely on the selected groove bottom. This protective surface should be designed as a protective plate and have a holding section which is radial with respect to the axis of the round profile and surrounds the latter and also a lateral section which is bent out from the surface of said holding section, on which lateral section said protective section is integrally formed in an inclined manner.

By virtue of the embodiment according to the invention, there is no longer any need for special configuration or reworking of the hollow profile. The connecting screw is simply rotated into the core hole—coarse-pitch thread or self-cutting thread—of one hollow profile and then pushed into the end of the other hollow profile. It is also conceivable firstly to screw the aforementioned threaded sleeve into the core hole, so as to provide for example a steel coarse-pitch thread for screwing in the connecting screw or toothed screw. To reduce friction, the latter can be provided with a coating of lubricant to make it easier to screw in.

Moreover, to prevent it from being screwed out, the screw head can be provided on the underside with raised areas in the form of dotted lines or teeth.

The screw head with the toothed edge should be as large as possible so as to achieve the greatest tightening torque. At the same time, however, it should not protrude in a disruptive manner beyond the core region of the profile. The greater the difference between the number of teeth of the screw and the number of teeth of the screwdriver, the greater the translation and thus the peripheral force which act on the toothed screw or connecting screw during tightening.

In addition, a drive may be provided in the screw head, which drive corresponds either to that of the toothed edge screwdriver in order to be able to operate with just one key or another profile (e.g. hexagon socket, six-lobe drives) by means of which the screw is firstly to be screwed into the core hole and then screwed back out somewhat, before it is introduced together with the hollow profile into the slot of the mating profile and tightened.

The dimensions for the screw and the screwdriver of course depend on the profiles to be connected. However, all compatible profiles can be connected by means of the same screw. The stability of the connection is sufficient for simple frames, protective fences, housings, etc. Securing against twisting of the profiles to be connected is provided if at least one groove is occupied by a flat element. The connection is extremely simple, fast and thus of course very cost-effective.

The tool is inserted close to said connecting bolt into the longitudinal groove which receives it, and its inclined insertion head is pushed in between the groove bottom and the screw head. When the ribs of said screw head mesh with the grooves of the tool, operation of the connecting bolt can readily be carried out. The inventor's aim is thus achieved in a particularly simple manner.

BRIEF DESCRIPTION OF THE DRAWINGS

Further advantages, features and details of the invention will emerge from the following description of preferred examples of embodiments and with reference to the drawing, in which:

FIG. 1 shows the front view of an extruded hollow profile comprising longitudinal grooves;

FIG. 2 shows an enlarged longitudinal section through parts of two hollow profiles arranged at right angles with respect to one another, with a connecting member;

FIG. 3 shows a detail from FIG. 2;

FIG. 4 shows a partially cut-away side view of a connecting member configured differently from FIGS. 2, 3, in an axially offset position of its individual parts;

FIG. 5 shows a side view of the connecting member rotated through 90° compared to FIG. 4;

DETAILED DESCRIPTION

Figure 6:
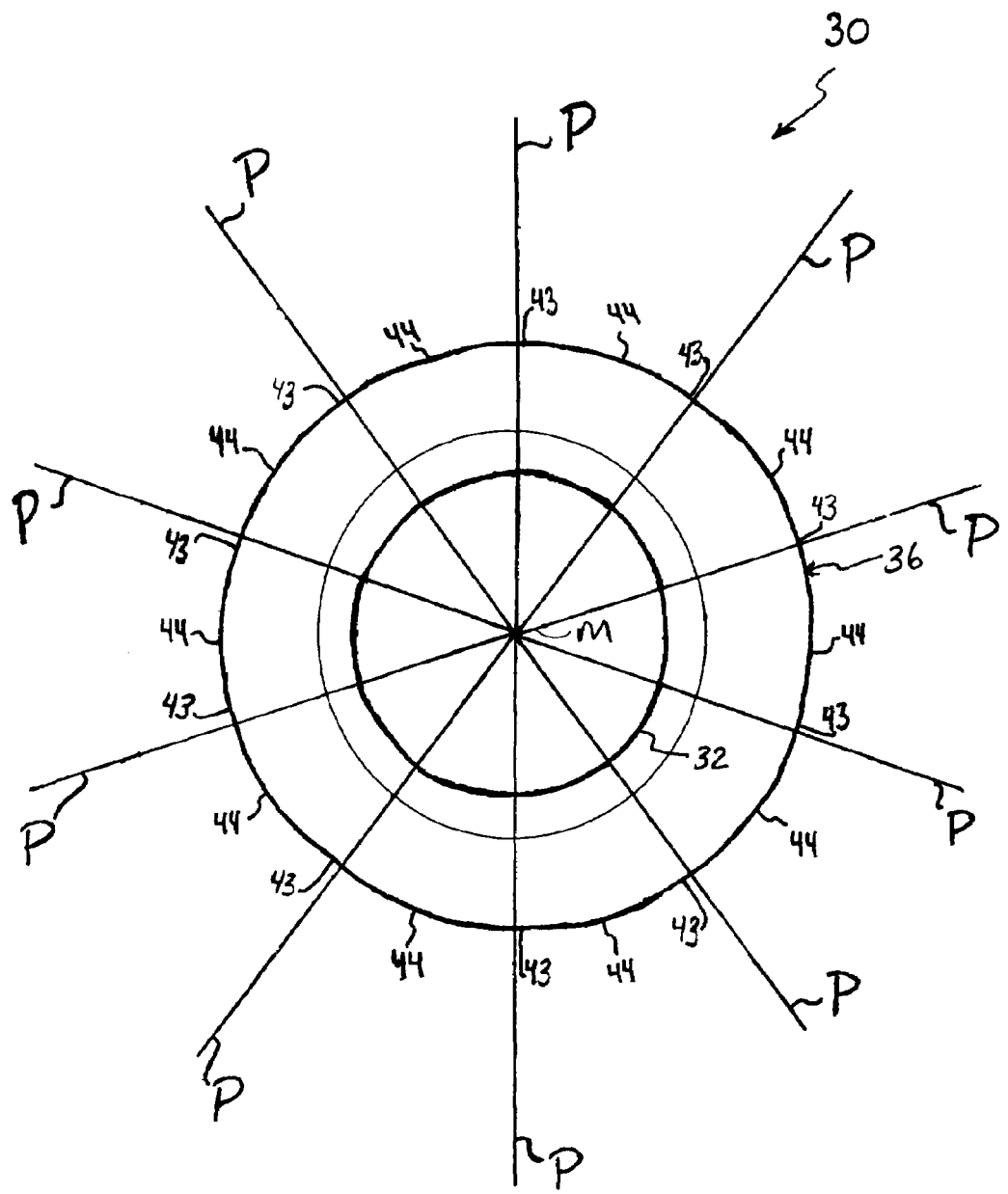
FIG. 6 shows a top view of the connecting screw of FIG. 3.

A hollow profile 10 of square cross section extruded from a light metal alloy, having cross-sectional axes B, $B_1$ as axes of symmetry placed through the centre Z of its front face 18—said centre Z being defined by a profile channel 14 of circular cross section of diameter d which runs in its central profile body 12 in the profile longitudinal axis A and is provided with radial edge grooves 16—has in each case in the centre of its profile side surfaces 20 a longitudinal groove 22 having a width b of for example 8 mm, said longitudinal groove being delimited at both ends by shaped ribs 24 with a thickness a of in this case 4 mm and merging into an undercut groove space 26 towards the profile longitudinal axis A. Said groove space is a channel-like recess of approximately triangular cross section which is overlapped by said shaped ribs 24 and has a depth e determined from the groove bottom 27 of 10 mm and a maximum width f of 22 mm and provides an axial insertion track 28 of height h on the inner side of the shaped ribs 24.

As shown in FIGS. 2, 3, and 6, assigned to the front face 18 of the hollow profile 10 is a hollow profile $10_a$ of the same shape which crosses over its profile longitudinal axis A. In order to be able to fix the two hollow profiles 10, $10_a$ to one another, use is made of a specially designed connecting screw 30. This is made of a hard metal—compared to the hollow profile 10, $10_a$—and comprises a screw shaft 32 having a length i of for example 25 mm and a disc-shaped screw head 36 having a diameter g of in this case 15 mm and a height n of 5 mm. Said screw shaft 32 is provided with a cutting thread 34 (shown only schematically in FIGS. 2, 3 for the sake of clarity), the outer diameter $d_1$ of which is greater than the diameter d of said profile channel 14. The cutting thread 34 has cut into the inner surface of said profile channel in the illustrated connecting position, and the shaft longitudinal axis M runs in the profile longitudinal axis A.

The shaft-facing stop surface 38, 38a of the screw head 36, which crosses over the shaft longitudinal axis M, merges into a cylindrical annular section 40, 40a having a height $n_1$ and said diameter g of the peripheral wall of the screw head 36. Adjoining the annular section 40, 40a is a wall surface 42, 42a of axial height $n_2$ which in cross section is inclined at an angle w of in this case 45° with respect to the shaft longitudinal axis M; integrally formed in this wall surface 42, 42a in the radial direction are grooves or notches 43, 43a which between them form ribs 44, 44a and a crenellated edge pattern 45 in said annular section 40, 40a. At a distance from said stop surface 38, 38a, the conically tapering wall section 42, 42a and thus also each of the notches 43, 43a merge into an annular, radially oriented step surface 46 which surrounds an integrally formed top body 48 having a height $n_3$. The smooth peripheral surface thereof is inclined towards the axis in cross section in a manner corresponding to the associated wall section 42, 42a within the screw head 36. The top body 48 ends at a head surface 50 which adjoins the screw head 36, wherein a hexagonal socket 49 can be seen in said head surface.

In order to produce the desired connection of the two hollow profiles 10, 10a, the screw head 36 of the connecting bolt or connecting screw 30 is pushed into one of the groove spaces 26 of the lower hollow profile 10a in FIGS. 2, 3; in the process, the screw shaft 32 slides in the longitudinal groove 22 of the hollow profile 10a in an axis-parallel direction. At a predefined point, the front face 18 of the other hollow profile 10 is brought towards the profile longitudinal axis A of the first hollow profile 10a at right angles, and the profile channel 14 of said second hollow profile 10 is axially assigned to the screw shaft 32.

Rotation of the screw shaft 32 into the profile channel 14 or the profile body 12 of the other hollow profile 10 which surrounds the latter is carried out by means of a tool 52 which is partially shown schematically in FIG. 2. This tool consists of a round profile 54 having a diameter q of in this case 8 mm, preferably a steel rod, said round profile optionally being bent at an angle in the longitudinal direction. Said diameter q should be shorter than the height or depth e of the groove space 26 of the hollow profile 10, 10a. This round profile 54 is designed to a length t of approximately 10 mm at one end as an insertion head 56 with a peripheral surface 57 which tapers conically at an angle y of approximately 25°, said peripheral surface being provided with parallel longitudinal notches 58 for receiving ribs 44, 44a of the screw head 36. A correspondingly inclined protective section 66 of a protective plate which is essentially designed as an angled piece bears against the peripheral or outer surface of said insertion head 56; said protective plate is placed onto the round profile 54 by means of a radial section 62, with a lateral section 64 of the protective plate 60 running parallel to the longitudinal axis Q of said round profile at a distance therefrom. This lateral section is angled towards the insertion head 56 close to the latter at a bend point 65, forming said protective section 66.

As shown in FIG. 3, the insertion head 56 of this tool 52 is pushed in between the screw head 36 of the installed connecting screw 30 and the groove bottom 27 (covered by the protective plate 60) of the corresponding longitudinal groove 22, with which the insertion head axis Q delimits an angle $w_1$. By rotating the insertion head 56 about its longitudinal axis Q, with the insertion head rolling on the protective section 66 of the protective plate 60, the toothed screw head 36 of the connecting screw 30 is operated and thus the screw shaft 32 is screwed in.

Figure 7:
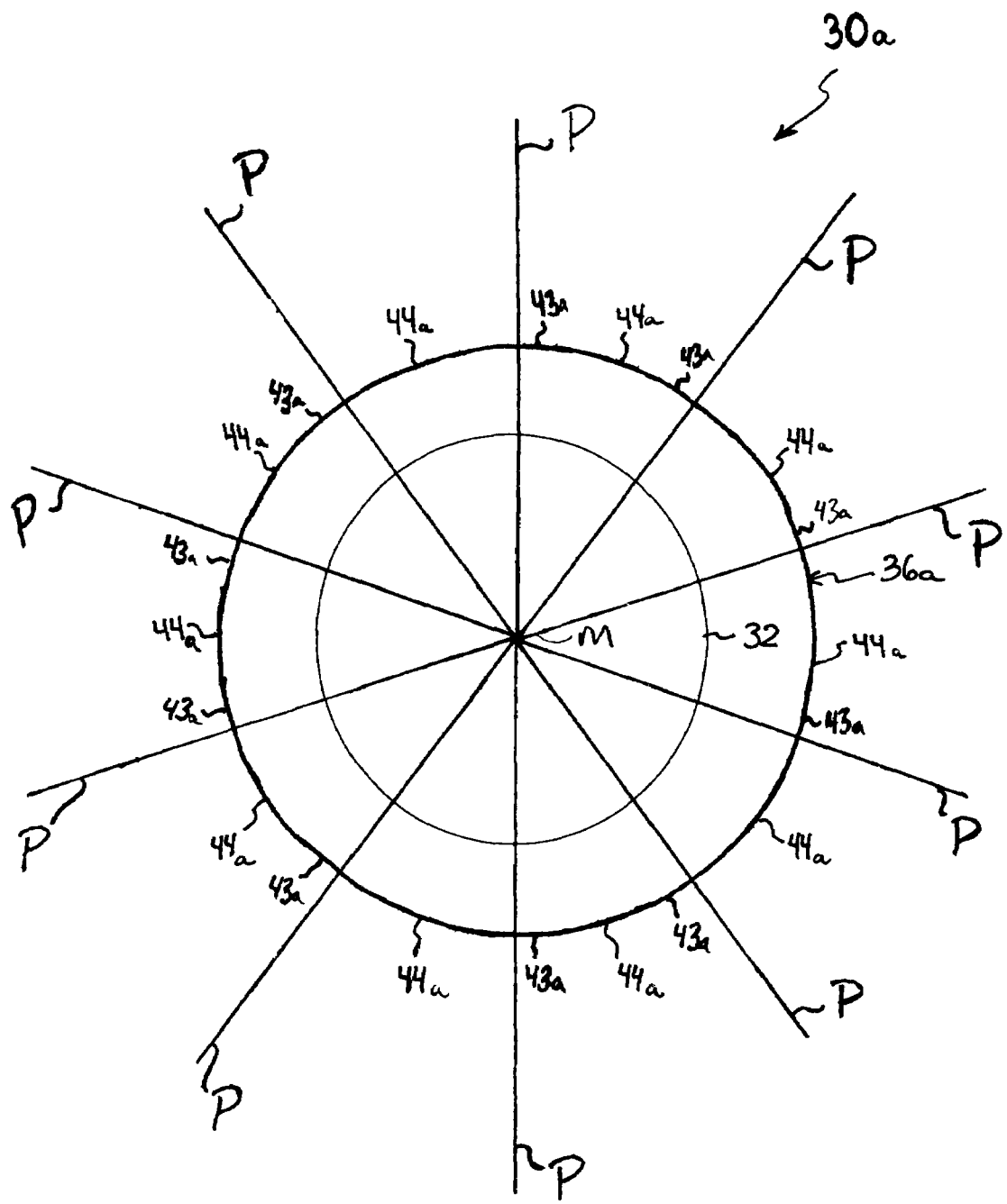
FIG. 7 shows a top view of the connecting screw of FIGS. 4 and 5.

A different embodiment of the connecting bolt 30a is shown in FIGS. 4, 5 and 7. The screw head 36a thereof has a relatively high annular section 40a which is adjoined by a conical wall section 42a of approximately the same height $n_2$. The latter ends at a free head surface 50a; the above-described top body is omitted here.

Assigned to the connecting bolt 30a is a slip-on collar 70 of rectangular outline having a height $i_1$ and a width $g_1$ on a base strip 71—having a height $i_2$, a length c and a width $b_1$—and an integrally formed collar piece 72 having a height $i_3$. The rectangular slip-on collar 70 is provided with a central opening 74 of diameter $d_2$ for receiving the shaft 32 of diameter $d_1$, which opening opens at the lower surface 73 into a circular widening 76 for receiving the annular section 40 of the screw head 36a. Said widening has a small axial depth $i_4$ and a diameter $g_1$ which slightly exceeds the diameter g of the screw head 36a.

Shown above the slip-on collar 70 in FIGS. 4, 5 is an axially assigned M8 threaded sleeve 80 having a length k and an outer diameter $g_2$ which corresponds approximately to the diameter g of the screw head 36a. The wall 82 of this threaded sleeve 80 is provided with an outer thread 84. Once the slip-on collar 70 has been fitted, the shaft 32 is introduced into the interior 78 of the threaded sleeve 80, in which it is then securely seated. This unit consisting of connecting bolt 30a, slip-on collar 70 and threaded sleeve 80 is then supplied to a hollow profile 10a. Since the width b of the longitudinal grooves 22 of the latter is somewhat greater than the width $b_1$ of the slip-on collar 70, the latter can be passed radially through one of the longitudinal grooves 22 in an axis-parallel manner and be rotated in the associated groove space 26; the width f of said groove space is somewhat greater than the length c of the base strip 71. In a hollow profile according to FIG. 1, the height $i_2$ of said base strip corresponds to the height h of the insertion track 28 of said groove space, or to the radial height of said groove space in the case of groove spaces of rectangular cross section.

The described embodiment according to FIGS. 4, 5 has the advantage that it does not have to be pushed in from the front face 18 of the profile; following the described rotation of the slip-on collar 70, the fixing operation for the other hollow profile 10 as shown in FIGS. 1 to 3 can begin immediately.

Overall, therefore, the connecting screw or toothed screw 30, 30a can be screwed into the core hole or profile channel 14 of the hollow profile 10 to be butt-jointed in such a way that, thereafter, the screw shaft or toothed bolt 32 together with the screw head 36, 36a can be inserted into the longitudinal groove 22 at the point to be connected. The movable screw head 36, 36a is rotated in the fixing position transversely to the longitudinal groove 22 and then the toothed bolt 32 is tightened by means of the tool 52.

The invention claimed is:

1. A device in combination with a tool (52), the device comprising a first hollow profile (10) and a second hollow profile (10a) arranged approximately at right angles to one another, the first hollow profile (10) has a profile channel (14) concentric to a profile longitudinal axis (A) of the second hollow profile (10a) and also, in at least one profile side surface (20) of the first hollow profile (10), an undercut longitudinal groove (22) parallel to the profile longitudinal axis (A), wherein the first and second hollow profiles (10, 10a) are held together by a connecting screw (30, 30a) comprising a shaft (32) which engages in the profile channel (14) of the first hollow profile (10) and a screw head (36, 36a) which is mounted in the undercut longitudinal groove (22) of the second hollow profile (10a), wherein the screw head (36, 36a) is provided on its periphery with grooves or notches (43) which run in planes extending from the shaft longitudinal axis (M) and form ribs (44) between the groove or notches (43), the screw head (36, 36a) is arranged in a groove space (26) of the second hollow profile (10a), and an insertion head (56) of the tool being integrally formed at one end of the tool in a round profile (54) to engage the screw head (36, 36a), said insertion head having longitudinal notches (58) in its peripheral surface (57), wherein a protective section (66) of a protective surface (60) bears against the peripheral or outer surface (57) of the insertion head (56), said protective surface being releasably fixed to the round profile (54), wherein the protective surface comprises a protective plate (60) having a holding section (62), which is radial with respect to the axis (Q) of the round profile (54) and surrounds the round profile (54), and also a lateral section (64) which is bent out from the surface of said holding section, and the protective section (66) is integrally formed in an inclined manner with respect to the lateral section (64) to prevent damage to the second hollow profile (10$_a$).

2. Device according to claim 1, wherein the screw head (36, 36$_a$) tapers conically towards a head surface (50, 50$_a$) remote from the shaft (32) and a wall surface (42) which is inclined at an angle (w) with respect to the shaft longitudinal axis (M) is provided with the grooves or notches (43) and ribs (44).

3. Device according to claim 2, wherein the angle (w) is approximately 45°.

4. Device according to claim 2, wherein the screw head (36, 36$_a$) has, between a shaft-facing connection surface (38) and the inclined wall surface (42), an annular section (40) of constant diameter (g) in which the shaft-facing ends of the notches (43) and of the ribs (44) form a crenellated edge pattern (45).

5. Device according to claim 2, wherein the inclined wall surface (42) ends at a radial step surface (46) and the radial step surface (46) surrounds in an annular manner an integrally formed top body (48) of the screw head (36), said top body (48) having a head surface (50) (FIG. 2).

6. Device according to claim 1, wherein the shaft (32) of the connecting screw (30, 30$_a$) is provided with a cutting thread (34).

7. Device according to claim 1, wherein the diameter (q) of the round profile (54) of the tool (52) is shorter than a depth (e) of the groove space (26) of the hollow profile (10, 10$_a$).

8. Device according to claim 1, wherein the peripheral surface (57) of the insertion head (56) tapers conically.

9. Device according to claim 8, wherein an angle (y) between an axis (Q) of the round profile (54) and the peripheral or outer surface (57) of the insertion head (56) is approximately 20° to 40°.

10. Device according to claim 9, wherein the angle (y) between the axis (Q) of the round profile (54) and the peripheral or outer surface (57) of the insertion head (56) is approximately 25°.

11. Device according to claim 1, wherein the lateral section (64) runs at a radial distance from the round profile (54).

* * * * *